United States Patent
Kim

(10) Patent No.: US 8,989,662 B2
(45) Date of Patent: Mar. 24, 2015

(54) METHOD AND APPARATUS FOR AUTOMATIC BLUETOOTH CONNECTION IN A MOBILE COMMUNICATION TERMINAL

(75) Inventor: Chul-Woo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1286 days.

(21) Appl. No.: 11/583,397

(22) Filed: Oct. 19, 2006

(65) Prior Publication Data

US 2007/0093207 A1   Apr. 26, 2007

(30) Foreign Application Priority Data

Oct. 25, 2005   (KR) .............................. 2005-0100516

(51) Int. Cl.
- H04B 7/00   (2006.01)
- H04W 12/06   (2009.01)
- H04L 29/06   (2006.01)
- H04M 1/725   (2006.01)
- H04W 84/18   (2009.01)

(52) U.S. Cl.
CPC ........... *H04W 12/06* (2013.01); *H04L 63/0492* (2013.01); *H04M 1/7253* (2013.01); *H04M 1/7258* (2013.01); *H04M 2250/02* (2013.01); *H04W 84/18* (2013.01)
USPC ........... 455/41.2; 455/564; 455/566; 345/172

(58) Field of Classification Search
CPC .................................................. H04M 1/7258
USPC .......................... 455/41.2, 564, 566; 345/172
See application file for complete search history.

(56) References Cited

U.S. PATENT DOCUMENTS

| | | | |
|---|---|---|---|
| 6,553,240 B1 * | 4/2003 | Dervarics | 455/566 |
| 6,633,757 B1 | 10/2003 | Hermann et al. | |
| 2001/0003097 A1 * | 6/2001 | Jeoung | 455/566 |
| 2003/0002678 A1 | 1/2003 | Kim | |
| 2004/0203384 A1 | 10/2004 | Sugikawa et al. | |
| 2005/0001902 A1 | 1/2005 | Brogan et al. | |
| 2005/0257052 A1 * | 11/2005 | Asai et al. | 713/166 |

FOREIGN PATENT DOCUMENTS

| | | |
|---|---|---|
| EP | 1 432 180 | 6/2004 |
| EP | 1 587 290 | 10/2005 |
| EP | 1 781 002 | 5/2007 |
| KR | 1020030002463 | 1/2003 |
| KR | 1020030037995 | 5/2003 |
| KR | 1020040023923 | 3/2004 |
| KR | 1020060107299 | 10/2006 |
| WO | WO 02/43389 | 5/2002 |

* cited by examiner

*Primary Examiner* — Hsin-Chun Liao
(74) *Attorney, Agent, or Firm* — The Farrell Law Firm, P.C.

(57) ABSTRACT

A method of automatically connecting to a peripheral Bluetooth device and service in a mobile communication terminal having a Bluetooth module is provided. Upon input of a key, it is determined whether the key includes a Bluetooth mode key. If the key includes the Bluetooth mode key, the terminal transitions to a Bluetooth mode. A Bluetooth device or service corresponding to the key as a short key is detected and connected.

7 Claims, 5 Drawing Sheets

METHOD AND APPARATUS FOR AUTOMATIC BLUETOOTH CONNECTION IN A MOBILE COMMUNICATION TERMINAL

PRIORITY

This application claims priority under 35 U.S.C. §119 to a Korean application filed in the Korean Intellectual Property Office on Oct. 25, 2005 and assigned Serial No. 2005-100516, the disclosure of which is incorporated herein by reference.

BACKGROUND OF THE INVENTION

1. Field of the Invention

The present invention relates generally to the Bluetooth® (hereinafter "Bluetooth") functionality of a mobile communication terminal, and in particular, to a method and apparatus of efficiently invoking a Bluetooth service by a short (hot) key in a mobile communication terminal equipped with a Bluetooth module.

2. Description of the Related Art

Along with the recent proliferation of mobile communication terminals due to their convenient portability, service providers or terminal manufacturers have developed more convenient additional functions in order to attract more users.

One of the additional functions, Bluetooth, provides short-range wireless connectivity between terminals. The Bluetooth functionality of mobile phones supports a variety of services including Headset, Music, Printing, and File Transfer.

To wirelessly communicate with peripheral devices equipped with Bluetooth modules, a mobile communication terminal first scans for Bluetooth devices and agrees to communicate a Bluetooth device by Bluetooth pairing.

FIG. 1 illustrates connections between a typical mobile communication terminal with a Bluetooth module and Bluetooth devices.

Referring to FIG. 1, a mobile communication terminal 100 equipped with a Bluetooth module scans for peripheral Bluetooth devices 111, 113, 115 and 117, makes a list 102 of the discovered Bluetooth devices 111, 113, 115 and 117, and selects an intended Bluetooth device from the list 102.

The mobile communication terminal 100 connects to the selected Bluetooth device or service. As more and more peripheral Bluetooth devices are provided and one Bluetooth device implements a plurality of services, the mobile communication terminal inconveniently must scan menus one by one for an intended Bluetooth device or service.

Therefore, there is a need for improved method and apparatus in a mobile communication terminal for easy and efficient connecting with Bluetooth device and service.

SUMMARY OF THE INVENTION

An object of the present invention is to substantially solve at least the above problems and/or disadvantages and to provide at least the advantages below. Accordingly, an object of the present invention is to provide a method and apparatus of facilitating connection to a peripheral Bluetooth device and service in a mobile communication terminal having a Bluetooth module.

Another object of the present invention is to provide a method and apparatus of facilitating connection to a peripheral Bluetooth device and service by use of a short key in a mobile communication terminal having a Bluetooth module.

According to one aspect of the present invention, a method of automatically connecting to a peripheral Bluetooth device and service in a mobile communication terminal having a Bluetooth module is provided. Upon input of a key, it is determined whether the key includes a Bluetooth mode key. If the key includes the Bluetooth mode key, the terminal transitions to a Bluetooth mode. A Bluetooth device or service corresponding to the key as a short key is detected and connected.

According to another aspect of the present invention, in a method of setting a short key for a peripheral Bluetooth device and service in a mobile communication terminal having a Bluetooth module, peripheral Bluetooth devices are scanned for and discovered peripheral Bluetooth devices are registered in a Bluetooth device list. Services that the registered Bluetooth devices support are detected and added to a Bluetooth service list. Short keys for the registered Bluetooth devices or services are received and registered.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is directed to a method for connecting to a peripheral Bluetooth device and service by a short key in a mobile communication terminal having a Bluetooth module. The following description is made based on the assumption that the "#" key is preset as the short key with which to invoke the Bluetooth device and service, although other keys may be preset to act as the short key.

Figure 1:
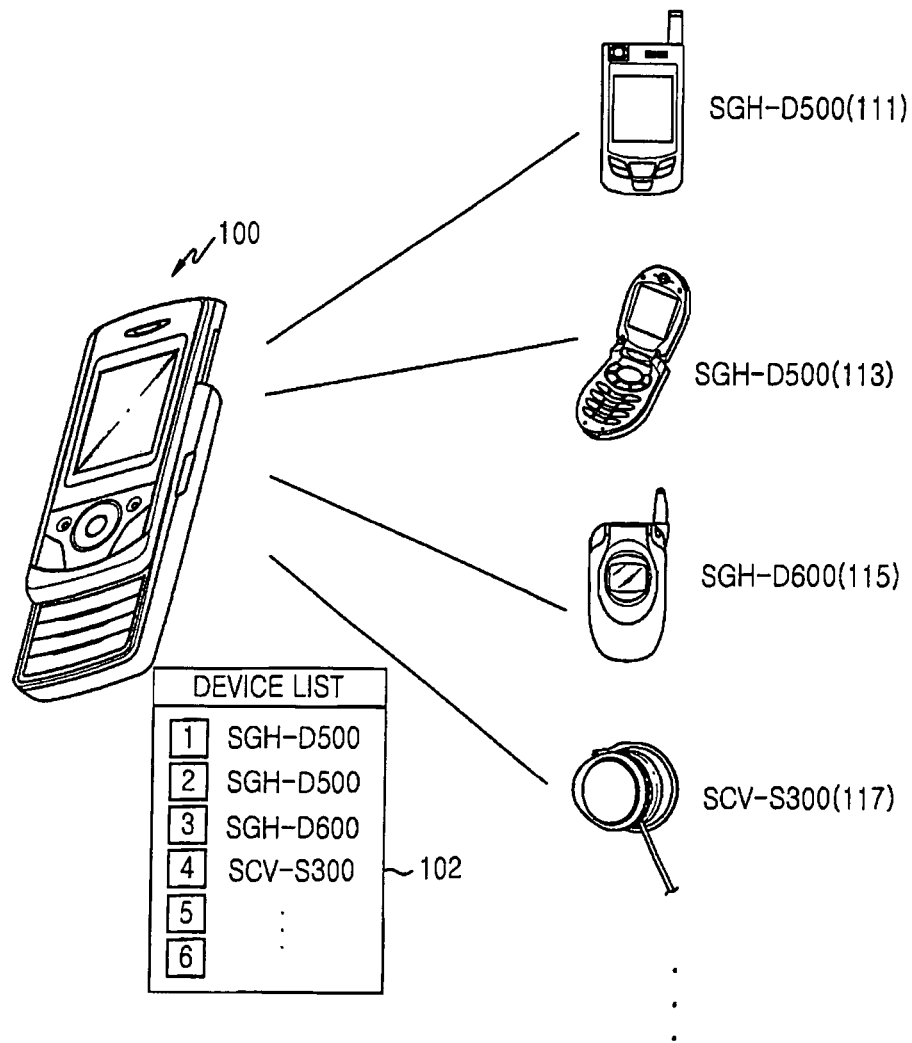
FIG. 1 illustrates connections between a typical mobile communication terminal with a Bluetooth module and Bluetooth devices.
Figure 2:
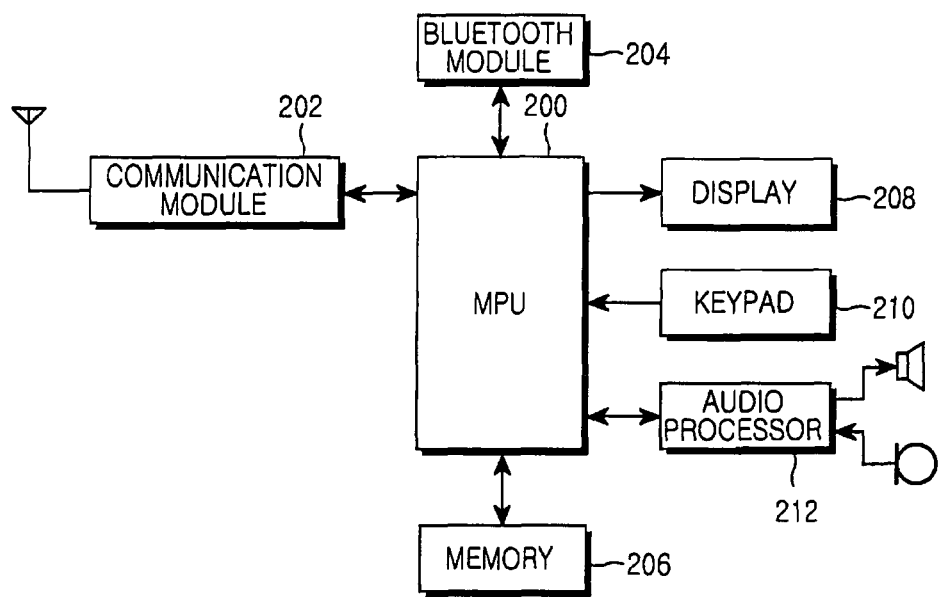
FIG. 2 is a block diagram of a mobile communication terminal having a Bluetooth module according to the present invention.

FIG. 2 is a block diagram of a mobile communication terminal having a Bluetooth module according to the present invention. The mobile communication terminal can be any of a cellular phone, a Personal Communication System (PCS) phone, a Personal Digital Assistant (PDA), and an International Mobile Telecommunication-2000 (IMT-2000) terminal, as long as it is equipped with a Bluetooth module. Hereinbelow, the present invention will be described in the context of a common configuration of those terminals.

Referring to FIG. 2, a Micro-Processor Unit (MPU), acting as a controller, 200 provides overall control to the mobile communication terminal. For example, the MPU 200 is responsible for processing and controlling voice communications and data communications. In accordance with the present invention, the MPU 200 sets a short key for a peripheral Bluetooth device and service registered to the mobile communication terminal so that a connection is facilitated to the peripheral Bluetooth device and service by use of a Bluetooth mode key and the short key. A description of the typical processing and control operation of the MPU 200 is not provided herein.

A communication module 202 transmits/receives a radio signal of data to/from an antenna. For transmission, the communication module 202 performs channel coding, spreading, and baseband-Radio Frequency (RF) upconversion on transmission data. For reception, the communication module 202 performs RF-baseband downconversion, despreading, and channel decoding on a received signal and thus recovers data.

A Bluetooth module 204 scans for available peripheral Bluetooth devices under the control of the MPU 200 and registers discovered Bluetooth devices in a Bluetooth device list by Bluetooth pairing. For communications with a peripheral Bluetooth module, during reception, the Bluetooth module 204 down converts a radio signal received from the Bluetooth module to a baseband signal and provides the baseband signal to the MPU 200. During transmission, the Bluetooth module 202 converts transmission data to an analog signal, upconverts the analog signal to a radio signal, and transmits the radio signal to the Bluetooth device.

A memory 206 includes a read Only Memory (ROM), a Random Access Memory (RAM), and a flash ROM. The ROM stores the microcodes of programs for processing and control of the MPU 200 and a variety of reference data. The RAM is a working memory for the MPU 200, for temporarily storing data generated during execution of programs. The flash ROM stores updatable data to be kept, such as a phone book, outgoing messages and incoming messages. In accordance with the present invention, the memory 206 stores the Bluetooth device list, a list of Bluetooth device services that the Bluetooth devices can provide, and information about short keys associated with the services.

A display 208 displays status information generated during the operation of the mobile communication terminal, limited digits and characters, moving pictures, and still images. The display 208 can be implemented by a color Liquid Crystal Display (LCD).

A keypad 210 is provided with digit keys 0 to 9 and function keys including Menu, Cancel (Clear), OK, Talk, End, Internet, and navigation (or directional) keys (▲/▼/◄/►). The keypad 210 provides key input data corresponding to a pressed key to the MPU 200.

A touch pad may use as an input means. In this case the touch pad includes a plurality of touch elements for inputting characters, numerals and directional function. Here, each touching element is corresponding to each key of the keypad.

An audio processor 212, called a CODEC, receives and outputs a voice signal through a microphone and a speaker. For example, the audio processor 212 converts digital data received from the MPU 200 to an analog voice signal and outputs the voice signal through the speaker. The audio processor 212 also converts a voice signal received through the microphone to digital data and provides the digital data to the MPU 200.

Figure 3:
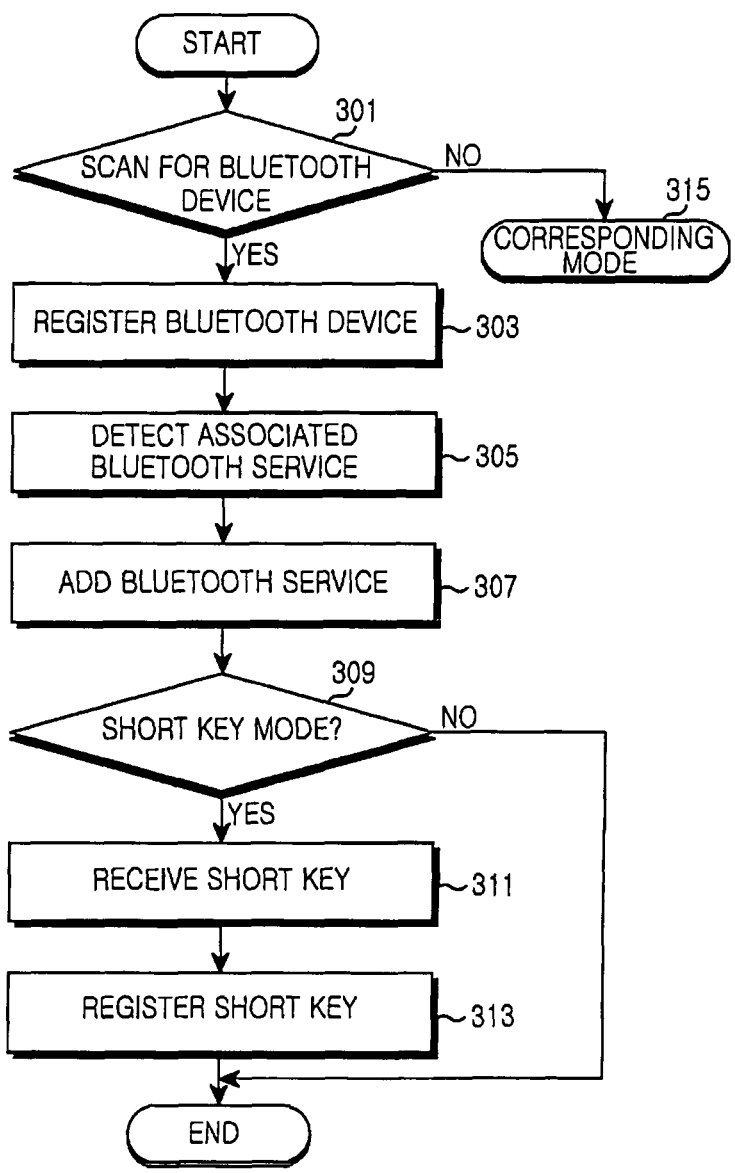
FIG. 3 is a flowchart illustrating an operation for registering a short key associated with a Bluetooth service in the mobile communication system according to the present invention.

FIG. 3 is a flowchart illustrating an operation for registering a short key associated with a Bluetooth service in the mobile communication system according to the present invention.

Referring to FIG. 3, the MPU 200 scans for peripheral Bluetooth devices through the Bluetooth module 204 in step 301. If no peripheral Bluetooth devices are discovered, the MPU 200 is placed in a corresponding mode (e.g. normal mode or idle mode) in step 315.

In the presence of any discovered peripheral Bluetooth device, the MPU 200 registers the discovered peripheral Bluetooth devices in a Bluetooth device list by pairing using Personal Identification Number (PIN) codes in step 303.

In step 305, the MPU 200 detects the services that the registered peripheral Bluetooth devices can provide.

The MPU 200 adds the detected services to a Bluetooth service list in step 307 and determines whether to set short keys for the registered Bluetooth devices or services in step 309. If a short key mode is not selected, the MPU 200 ends the process.

If the short key mode is selected, the MPU 200 receives a short key to be associated with a Bluetooth device and service by key input from a user in step 311. The MPU 200 registers the short key in a Bluetooth short key table of the memory 206 in step 313 and then ends the process.

Figure 4:
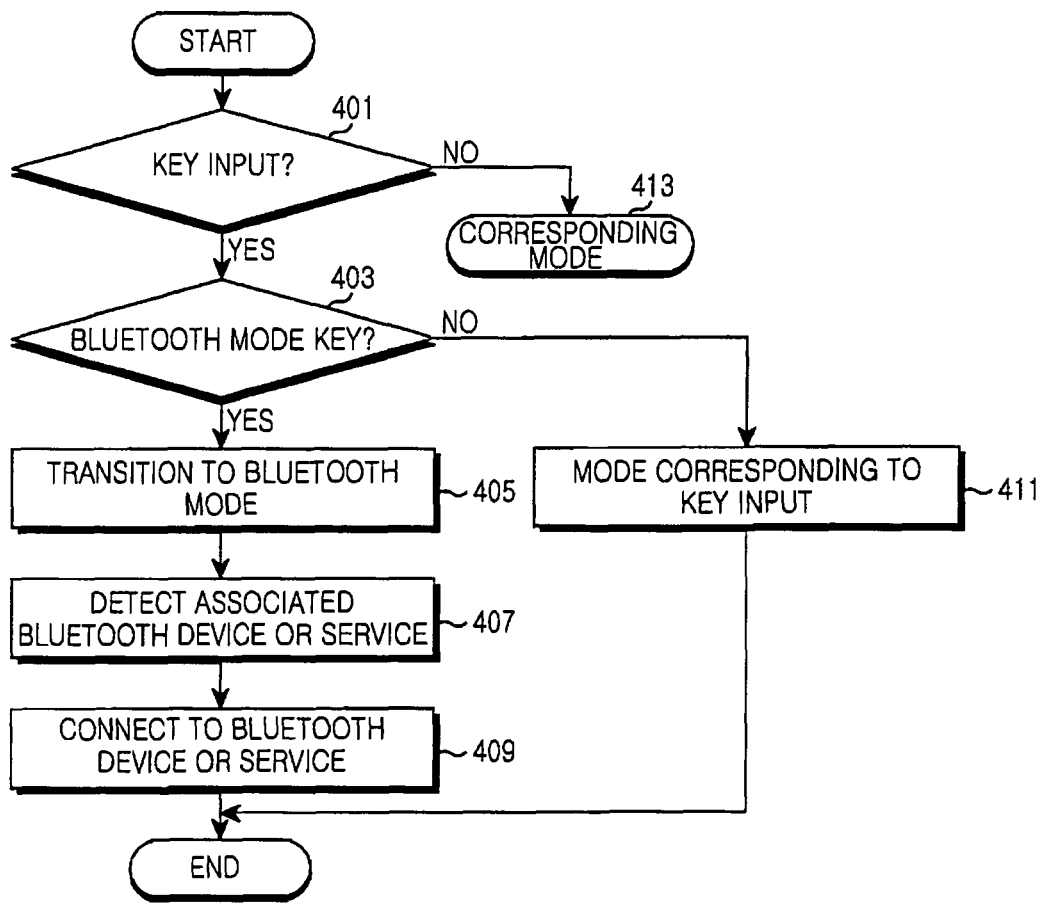
FIG. 4 is a flowchart illustrating an operation for invoking a Bluetooth service by a short key in the mobile communication system according to the present invention.

FIG. 4 is a flowchart illustrating an operation for invoking a Bluetooth service by a short key in the mobile communication system according to the present invention.

Referring to FIG. 4, the MPU 200 monitors reception of a key from the user in step 401. If no key is entered, the MPU 200 enters a corresponding mode (e.g. normal mode or idle mode) in step 413.

Figure 5A:
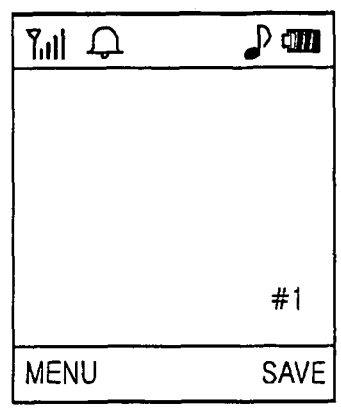
FIGS. 5A and 5B illustrate screen displays shown when a Bluetooth service is invoked by a short key in the mobile communication terminal according to the present invention.

If a key is entered, the MPU 200 determines whether the key includes a Bluetooth mode key in step 403. For example, for the input of "#1", the MPU 200 recognizes the Bluetooth mode key "#", as illustrated in FIG. 5A.

In the absence of the Bluetooth mode key, the MPU 200 invokes a function corresponding to the entered key (e.g. phone mode), recognizing that the entered key is associated with an ordinary function other than Bluetooth in step 411.

In the presence of the Bluetooth mode key, the MPU 200 transitions to the Bluetooth mode in step 405 and detects a peripheral Bluetooth device or service corresponding to the entered short key in the Bluetooth short key table in step 407. While not shown, if the short key is not detected in the Bluetooth short key table, the MPU 200 displays a short key input error message or error alarm.

Figure 5B:
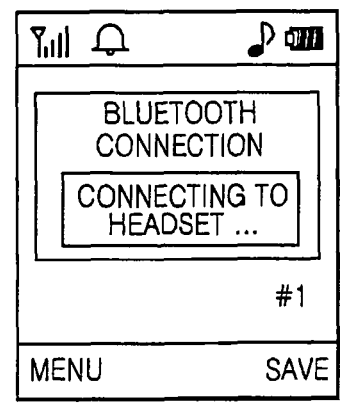

In step 409, the MPU 200 connects to the peripheral Bluetooth device or service, as illustrated in FIG 5B. Then the MPU 200 ends the process.

In accordance with the present invention as described above, short keys are set for a plurality of Bluetooth devices and services in a mobile communication terminal having a Bluetooth module. Therefore, an intended Bluetooth device and service can be connected quickly and easily among many Bluetooth devices and services.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of automatically connecting to a peripheral Bluetooth device in a mobile terminal including a Bluetooth module, the method comprising the steps of:

detecting a key sequence comprising at least two key input data;

identifying a first key input data in the key sequence for recognizing a Bluetooth mode and identifying a second key input data in the key sequence as an identifier of a specific Bluetooth device previously registered in the mobile terminal, in response to detecting the key sequence;

automatically performing the Bluetooth mode in response to the identified first key input data;

searching peripheral Bluetooth devices in order to detect the specific Bluetooth device corresponding to the identified second key input;

detecting the specific Bluetooth device corresponding to the identified second key input data from the searched peripheral Bluetooth devices; and connecting to the detected specific Bluetooth device.

2. The method of claim 1, further comprising notifying that the specific Bluetooth device is not available, when the specific Bluetooth device is not detected in the searched peripheral Bluetooth devices.

3. The method claim 2, wherein notifying that the specific Bluetooth device is not available comprises at least one of:

displaying a short input error message; and generating an error alarm.

4. A mobile terminal, comprising:

an input means for detecting a key sequence comprising at least two key input data; and a controller for:

identifying a first key input data in the key sequence for recognizing a Bluetooth mode and identifying a second key input data in the key sequence as an identifier of a specific Bluetooth device previously registered in the mobile terminal, in response to the input means detecting the key sequence;

automatically performing the Bluetooth mode in response to the identified first key input data;

searching peripheral Bluetooth devices in order to detect the specific Bluetooth device corresponding to the identified second key input;

detecting the specific Bluetooth device corresponding to the identified second key input data from the searched peripheral Bluetooth devices; and connecting to the detected specific Bluetooth device.

5. The mobile terminal of claim 4, wherein the controller notifies that the specific Bluetooth device is not available, when the specific Bluetooth device is not detected in searched peripheral Bluetooth devices.

6. The mobile terminal claim 4, further comprising a display, wherein the controller notifies that the specific Bluetooth device is not available by displaying a short input error message on the display.

7. The mobile terminal claim 4, further comprising a speaker, wherein the controller notifies that the specific Bluetooth device is not available by generating an error alarm through the speaker.

* * * * *